(12) United States Patent
Fong

(10) Patent No.: US 6,422,725 B1
(45) Date of Patent: Jul. 23, 2002

(54) GROUND LIGHTING DEVICE FOR MOTOR VEHICLES

(75) Inventor: Ching Fong, Troy, MI (US)

(73) Assignee: Textron Automotive Company, Inc., Troy, MI (US)

( * ) Notice: Subject to any disclaimer, the term of this patent is extended or adjusted under 35 U.S.C. 154(b) by 0 days.

(21) Appl. No.: 09/619,147

(22) Filed: Jul. 19, 2000

(51) Int. Cl.[7] .................................................. B60Q 1/24
(52) U.S. Cl. ........................ 362/500; 362/42; 362/287; 362/427
(58) Field of Search ........................ 362/42, 500, 269, 362/285, 287, 418, 427

(56) References Cited

U.S. PATENT DOCUMENTS

| | | | | |
|---|---|---|---|---|
| 4,802,069 A | * | 1/1989 | Chandler | 362/83 |
| 4,894,755 A | * | 1/1990 | Chandler | 362/83 |
| 5,040,100 A | * | 8/1991 | Di Gaetano | 362/80 |
| 5,457,614 A | * | 10/1995 | Duty | 362/220 |
| 5,548,274 A | * | 8/1996 | Anderson et al. | 340/468 |
| 5,558,426 A | * | 9/1996 | Cabanatan | 362/78 |

* cited by examiner

Primary Examiner—Sandra O'Shea
Assistant Examiner—John Anthony Ward
(74) Attorney, Agent, or Firm—Grossman, Tucker, Perreault, Pfleger, PLLC

(57) ABSTRACT

A motor vehicle comprising a lighting device disposed on a motor vehicle; the lighting device configured to emit light and aim at least a portion of the light in the direction of and illuminate a wheel well of the motor vehicle.

17 Claims, 2 Drawing Sheets

GROUND LIGHTING DEVICE FOR MOTOR VEHICLES

TECHNICAL FIELD OF THE INVENTION

This invention relates generally to a ground lighting device for motor vehicles.

BRIEF DESCRIPTION OF THE DRAWINGS

To better understand and appreciate the invention, refer to the following detailed description in connection with the accompanying drawings.

DETAILED DESCRIPTION OF THE INVENTION

Figure 1:
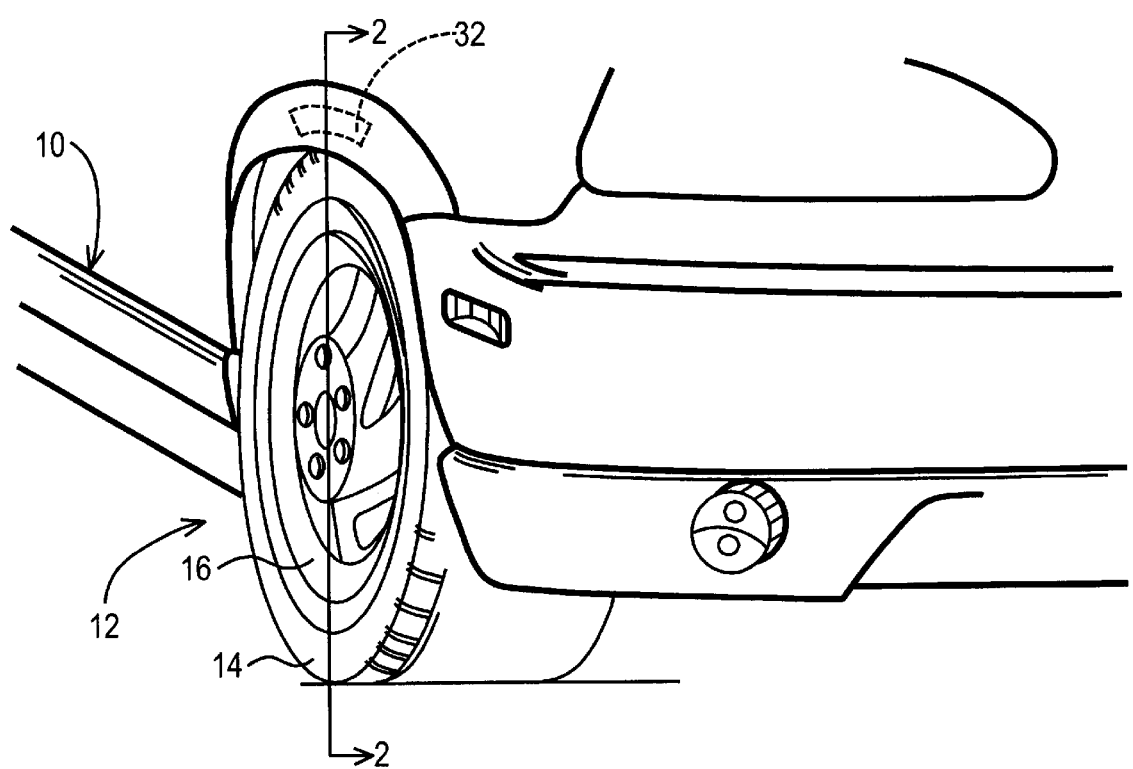
FIG. 1 is a perspective view of the rear portion of a motor vehicle according to the invention.

As shown in FIG. 1, a motor vehicle is shown at 10. Motor vehicle 10 may include, but is not limited to, passenger cars, sport utility vehicles, minivans, light trucks and sports cars. Vehicle 10 includes a wheel 12 comprising tire 14 and rim 16. Rim 16 may have additional components located thereon including, but not limited to, wheel covers, center caps and trim rings.

Figure 2:
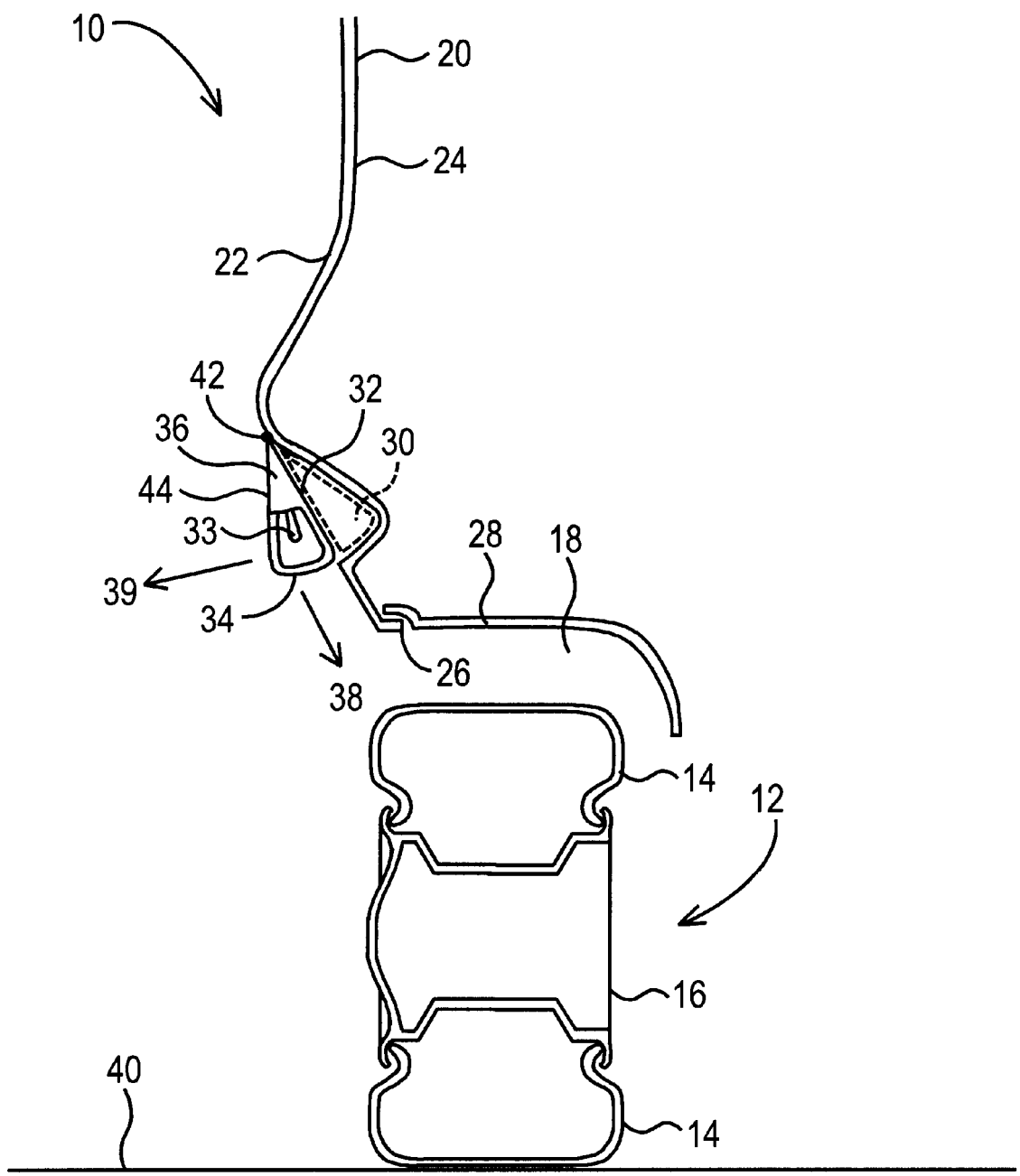
FIG. 2 is a partial cross-sectional view of the motor vehicle of FIG. 1 taken along line 2—2.

As best shown in FIG. 2, wheel 12 is located within a wheel well 18 adjacent an exterior body member 20. Exterior body member 20 is further defined by outer surface 22, inner surface 24 and a perimeter edge 26 which partially defines wheel well 18. Outer surface 22 of exterior body member 20 is a surface generally viewed by vehicle onlookers while inner surface 24 is not generally viewable. Exterior body member 20 may include, but is not limited to body panels (e.g. fenders, quarter panels, rocker panels) and bumper fascias as well as any components located thereon including, but not limited to, foilers, claddings, fender flares, trim moldings, and rub strips.

Perimeter edge 26 of exterior body member 20 may be adjacent an exterior close-out member such as inner wheel housing 28. Inner wheel housing 28 may include, but is not limited to, inner wheel houses, fender liners, splash shields and splash guards. Perimeter edge 26 of exterior body member 20 and inner wheel housing 28 may be fixed to one another (e.g. welded, mechanically fastened) or merely fit adjacent one another such as with an overlap.

A lamp or lighting device 32 is attached to the motor vehicle 10 and preferably to exterior body member 20 or inner wheel housing 28. More preferably lighting device 32 may be held within a receptacle 30, generally in the form of an opening or a recess, in the exterior body member 20. Preferably, the receptacle 30 is adjacent wheel well 18 of exterior body member 20. Also preferably, lighting device 32 is attached to the motor vehicle 10 by mechanical fasteners such as threaded fasteners and spring clips.

Lighting device 32 preferably comprises a light source 33, a lens 34 and a housing 36. Lens 34 and housing 36 are preferably connected along their peripheral edges in a manner known in the art with light source 33 contained within the confines thereof. For example, lens 34 may include a tongue portion which is inserted into a mating groove portion on housing 36 containing a hot melt adhesive.

Preferably, at least a portion of light 38 emitted from lighting device 32 may be directed or aimed in the direction of and more preferably, directly on wheel well 18 to illuminate wheel well 18. More preferably, inclusive of wheel well 18, light 38 from lighting device 32 is directed or aimed in the direction of and, more preferably, directly on wheel 12 to illuminate wheel 12. Even more preferably, inclusive of wheel 12, light 38 from lighting device 32 is directed or aimed in the direction of and, more preferably, directly on rim 16 to illuminate rim 16.

Lighting device 32 may serve multiple function, alone or in combination with other lighting devices. For example, lighting device 32 may be part of a lamp housing including head lamps, side marker lamps or tail lamps. As shown, lighting device 32 also may simultaneously function as a side marker lamp aiming at least a portion of light 39 to the side of motor vehicle 10 (i.e. generally perpendicular to the direction of vehicle travel) to illuminate ground surface 40 to aid the driver in making turns.

When not directing light 38 towards wheel well 18, lens 34 of lighting device 32 may be at least partially hidden from view or blocked to protect the lens 34 from damage due to flying debris (e.g. stones, dirt, sand) near the ground surface 40 or may be hidden as to conceal its presence and thus detection by vehicle onlookers. For example, a door or other type of cover may be placed over the lens 34. As shown in phantom, lighting device 32 rotates and moves with the aid of a hinge member 42 into receptacle 30 which conceals or blocks a portion of lens 34 from view. More specifically, the portion of the lens which directs light 38 becomes concealed or nonfunctional, while the portion of the lens which directs light 39 remains exposed and functional (i.e. continues to illuminate the ground surface to the side of the motor vehicle). Preferably outer surface 44 of housing 36 complements (e.g. same or similar color, same or similar texture) an adjacent portion of exterior body member 20. Conversely, hinge member 42 also moves enables lighting device to move out of receptacle 30 from a nonfunctional position back into a functional position where it may illuminate wheel well 18.

Preferably, light 38 is from the visible range of the electromagnetic spectrum. In this manner, light 38 may be used to aid in removing wheel 12 from vehicle 10 in the event of a flat tire 14, particularly in conditions where light in addition to ambient light is desirable (e.g. after sunset and before sunrise). Additionally, light 38 may be used to enhance or change the visual appearance of wheel 12, particularly in conditions where light in addition to ambient light is desirable (e.g. after sunset and before sunrise). For example, light 38 may be used to change the reflective or colored appearance of rim 16 as compared to when light 38 from lighting device 32 is not used.

While light 38 is preferably from the visible range of the electromagnetic spectrum, it is recognized that light 38 may be from other ranges of the electromagnetic spectrum. For example, light 38 may be from the ultraviolet range of the electromagnetic spectrum and, when cast towards white lettering on tire 14, may enhance or change the visual appearance of tire 14 by making the white lettering to appear to have a purple color or tint.

In other variations, light 38 may also be directed towards ground surface 40 adjacent wheel 12 to illuminate tools such as the jack, wrenches, lug nuts, etc. Also, while light 38 from lighting device 32 is preferably cast directly towards or on wheel 12 or rim 16, light 38 may be cast indirectly towards or on wheel 12 or rim 16 such as through the use of a separate reflector.

We intend the above description to illustrate embodiments of the present invention by using descriptive rather than limiting words. Obviously, there are many ways that one might modify these embodiments while remaining within the scope of the claims. In other words, there are many other ways that one may practice the present invention without exceeding the scope of the claims herein.

What is claimed is:

1. A motor vehicle comprising:
    a lighting device disposed on the motor vehicle including a receptacle; said lighting device capable of being disposed at least partially within said receptacle on the motor vehicle, the lighting device moveable between a first position and a second position, in the first position the lighting device configured to emit light to the ground surface to the side of the vehicle when disposed partially within said receptacle, and in the second position the lighting device configured to emit light in the direction of a wheel well of the motor vehicle.

2. The motor vehicle of claim 1 wherein the wheel well contains a wheel and the lighting device is configured to aim at least a portion of the light in the direction of and illuminate the wheel.

3. The motor vehicle of claim 2 wherein the wheel contains a tire and the lighting device is configured to aim at least a portion of the light in the direction of and illuminate the tire.

4. The motor vehicle of claim 2 wherein the wheel contains a wheel rim and the lighting device is configured to aim at least a portion of the light in the direction of and illuminate the wheel rim.

5. The motor vehicle of claim 1 wherein the lighting device is further configured to simultaneously aim at least a portion of the light in the direction of and illuminate a ground surface to the side of the motor vehicle.

6. The motor vehicle of claim 5 wherein the lighting device is further configured to block the portion of the light aimed in the direction of the wheel well from illuminating the wheel well while the portion of the light aimed in the direction of the ground surface to the side of the motor vehicle continues to illuminate the ground surface to the side of the motor vehicle.

7. The motor vehicle of claim 1 wherein the receptacle comprises a recess.

8. The motor vehicle of claim 1 wherein the receptacle comprises an opening.

9. The motor vehicle of claim 1 wherein the lighting device is at least partially removable from the receptacle.

10. The motor vehicle of claim 1 wherein the lighting device is attached to the motor vehicle.

11. The motor vehicle of claim 10 wherein the lighting device is attached to the motor vehicle by a mechanical device.

12. The motor vehicle of claim 11 wherein the mechanical device includes threaded fasteners.

13. The motor vehicle of claim 11 wherein the mechanical device includes a hinge.

14. The motor vehicle claim 13 wherein the hinge enables the lighting device to move into and out of a receptacle.

15. The motor vehicle claim 13 wherein the hinge enables the lighting device to move into and out of an at least partially nonfunctional position.

16. A method of providing illumination to a wheel well of a motor vehicle comprising:
    providing a motor vehicle having a wheel well and a receptacle in said wheel well;
    providing a lighting device capable of being disposed at least partially within said receptacle and is moveable between a first position and a second position;
    positioning the lighting device in a first position at least partially within said receptacle to illuminate the ground surface to the side of the vehicle; and
    positioning the lighting device in the second position to illuminate the wheel well of the motor vehicle.

17. The method of providing illumination to the wheel well of a motor vehicle of claim 16 further comprising the steps of:
    moving the lighting device from out of an at least partially nonfunctional position.

* * * * *